US011782011B2

United States Patent
Zhang et al.

(10) Patent No.: US 11,782,011 B2
(45) Date of Patent: Oct. 10, 2023

(54) ULTRASENSITIVE ELECTROCHEMICAL BIOSENSORS

(71) Applicant: Morgan State University, Baltimore, MD (US)

(72) Inventors: Yongchao Zhang, Ellicott City, MD (US); Aeshah Alshehri, Tanomah (SA)

(73) Assignee: MORGAN STATE UNIVERSITY, Baltimore, MD (US)

( * ) Notice: Subject to any disclaimer, the term of this patent is extended or adjusted under 35 U.S.C. 154(b) by 139 days.

(21) Appl. No.: 17/243,107

(22) Filed: Apr. 28, 2021

(65) Prior Publication Data
US 2022/0057356 A1    Feb. 24, 2022

Related U.S. Application Data

(60) Provisional application No. 63/016,369, filed on Apr. 28, 2020.

(51) Int. Cl.
*G01N 27/327* (2006.01)

(52) U.S. Cl.
CPC ..... *G01N 27/3277* (2013.01); *G01N 27/3276* (2013.01)

(58) Field of Classification Search
None
See application file for complete search history.

(56) References Cited

U.S. PATENT DOCUMENTS

2002/0081588 A1* 6/2002 De Lumley-woodyear ................ B01J 19/0046 435/287.2
2017/0219572 A1* 8/2017 Kim ..................... G01N 33/542

* cited by examiner

*Primary Examiner* — J. Christopher Ball
(74) *Attorney, Agent, or Firm* — Whiteford, Taylor & Preston, LLP; Peter J. Davis (57) ABSTRACT

An electrochemical biosensor includes a working electrode modified with a redox polymer and amine-terminated capture aptamer specific for a particular detection target. The binding sequence of the capture aptamer is also complementary to part of a second ssDNA which is labeled with HRP (horseradish peroxidase). The capture aptamer will form dsDNA with the HRP-labeled ssDNA and bring HRP into electrical contact with the redox polymer and the electrode. Prior to capturing the detection target, addition of $H_2O_2$ will lead to the highest reduction current due to the redox polymer-mediated, enzyme-amplified electroreduction of $H_2O_2$.

18 Claims, 8 Drawing Sheets

Specification includes a Sequence Listing.

Redox polymer/aptamer/HRP based aflatoxin sensor and assay

Figure 1. Redox polymer/aptamer/HRP based aflatoxin sensor and assay

Figure 2. Preparation of PVI

Figure 3. Detailed structure of reaction forming osmium complex

Figure 4. Chemical reaction of PVI with $Os(bpy)_2Cl^{+/2+}$

Figure 5. Structure of Os(bpy)2Cl complexed with poly(1-vinylimidazole)

Figure 6. Dialysis of PVI-Os complex

Figure 7. Electrodeposition process

Figure 8. Electrodeposition of PVI-Os complex

Figure 9. PEGDGE chemical structure

Figure 10. Crosslinking between PVI and PEGDGE

Figure 11. EC cell schematic

Figure 12. CV of Electrodeposition

Figure 13. Scan rate vs. peak current for electrodeposition

Figure 14. CV of cross linking

Figure 15. Peak current vs square root of scan rate (cross linking)

Figure 16. Results from detection tests of AFB1

SEQUENCE LISTING

```
<160> NUMBER OF SEQ ID NOS: 2

<210> SEQ ID NO 1
<211> LENGTH: 20
<212> TYPE: DNA
<213> ORGANISM: Artificial Sequence
<220> FEATURE:
<223> OTHER INFORMATION: synthesized

<400> SEQUENCE: 1
aaaaaatgtg ggcctagcga                                              20
```

```
<210> SEQ ID NO 2
<211> LENGTH: 50
<212> TYPE: DNA
<213> ORGANISM: Artificial Sequence
<220> FEATURE:
<223> OTHER INFORMATION: synthesized

<400> SEQUENCE: 2
gttgggcacg tgttgtctct ctgtgtctcg tgcccttcgc taggcccaca                    50
```

ULTRASENSITIVE ELECTROCHEMICAL BIOSENSORS

GOVERNMENT LICENSE RIGHTS

This invention was made with government support under Award Number NIH ULIGM118973 awarded by the National Institutes of Health. The U.S. government has certain rights in the invention.

BACKGROUND OF THE INVENTION

Field of the Invention

The present invention relates to biosensors and methods for their use.

SUMMARY OF THE INVENTION

According to the present invention, there is presented the use of redox polymers such as PVI-Os(bpy)$_2$ to carry reducible/oxidizable groups such as Os(bpy)$_2$ complexes on their flexible side chains and the use of redox polymers in conjunction with redox enzymes and aptamers to achieve the development of ultra-sensitive electrochemical biosensors.

More specifically, a working electrode in an electrochemical cell is modified with the redox polymer by electro-crosslinking/depositing PVI-Os(bpy)$_2$, amine-terminated capture aptamer (specific for a particular detection target is co-deposited with the redox polymer. Part of the capture aptamer (the binding sequence) is also complementary to part of a second ssDNA which is labeled with HRP (horseradish peroxidase), and the capture aptamer will form dsDNA with the HRP-labeled ssDNA and bring HRP into electrical contact with the redox polymer and the electrode. Prior to capturing the detection target, addition of H$_2$O$_2$ will lead to the highest reduction current due to the redox polymer-mediated, enzyme-amplified electroreduction of H$_2$O$_2$.

Alternatively, the electrode can be modified with the redox polymer hydrogel, PVI-Os(bpy)$_2$, using a crosslinker such as poly(ethylene glycol) diglycidyl ether; i.e., PEGDGE. It is then followed by electrodeposition of amine-terminated capture aptamer.

The PVI-Os modified aptamer-sensing electrode (made with electrodeposition of PVI-Os or PESGDGE crosslinking) is immersed in a buffer solution (pH 7.4) containing the aptamer, and a negative potential (e.g. −1.4 V) (vs. Ag/AgCl) is applied for a certain amount of time, which allows the aptamer to be immobilized in the PVI-Os film. Then the electrode is immersed in a buffer solution containing HRP-labeled ssDNA which forms double helix with the immobilized capture aptamer. The electrode is then labeled with the enzyme HRP which catalyzes the electroreduction to H$_2$O$_2$ to water. A reduction current can be detected when H$_2$O$_2$ is present in the solution.

Figure 1:
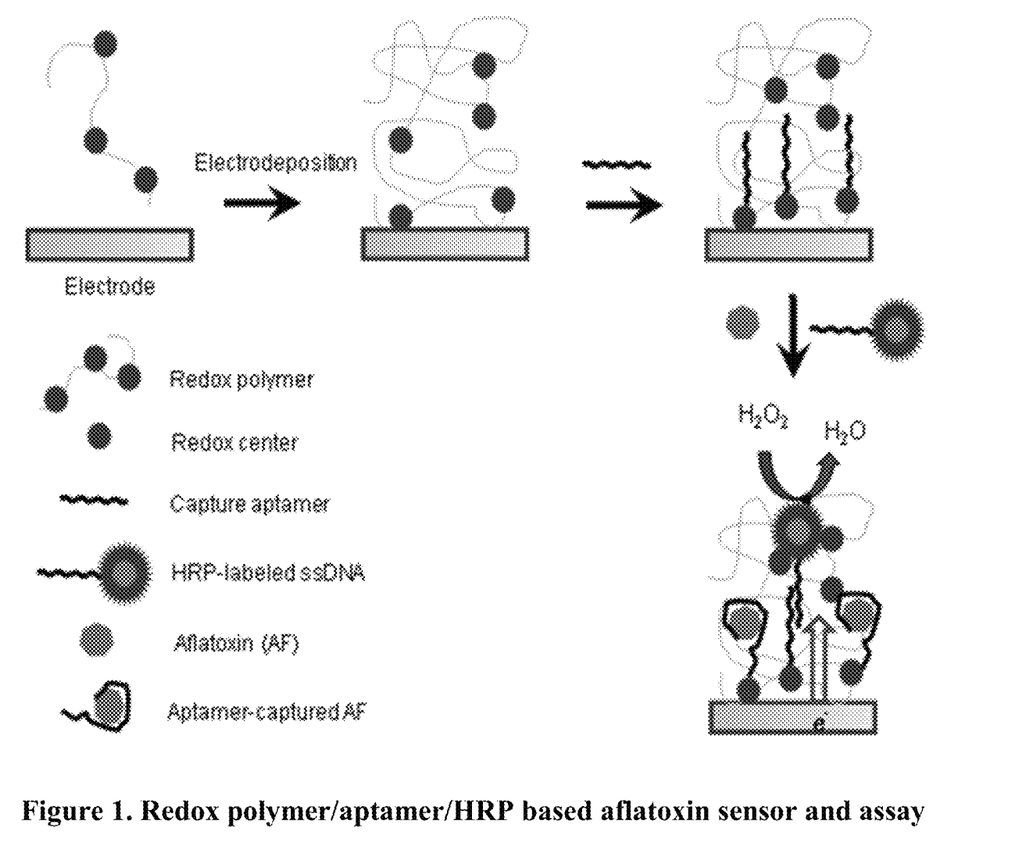
FIG. 1 is a representation of a redox polymer/aptamer/HRP based aflatoxin sensor and assay according to an embodiment of the invention.

The effectiveness of the invention was demonstrated with detection of aflatoxin by immersing the above electrode sensor in a solution containing aflatoxins and H$_2$O$_2$. Binding of aflatoxin by the capture aptamer released some of the HRP-labeled ssDNA, leading to lowered reduction current which served as a measure of the level of aflatoxin. See FIG. 1.

The redox polymer/aptamer/redox enzyme-modified electrode sensor of the invention is not limited to aflatoxins; by changing the aptamer, the electrode can be made sensitive to virtually any kind of toxins, biological molecules, even viruses and bacteria.

DETAILED DESCRIPTION

Poly (1-vinyl imidazole) ("PVI") and osmium bipyridine complexes are prepared separately. Then, they are chemically derived into the Osmium-PVI (Nakabayashi et. al, 2001) polymer. Next, the chemical sensor electrode is made also using known methods from literature (Ohara et. al, 1993) and modified with catechol cross-linked with chitosan (Zhang et. al, 2012). The hydrogel PVI$_n$-Os can function as a high conductor of electrons into the modified chemical sensor electrode. PVI$_n$-Os polymers are highly water-soluble with redox potential of up to 200 mV. The voltammogram of this polymer has constant ΔEp (separation of peaks) value around 100 mV which shows that the electron diffusion kinetics is better than other similar films. These polymers form amperometric glucose sensors by linking with glucose oxidase (GOX). The procedures to make the above-mentioned chemicals are described in detail below.

Preparation of poly (1-vinyl imidazole)

Figure 2:
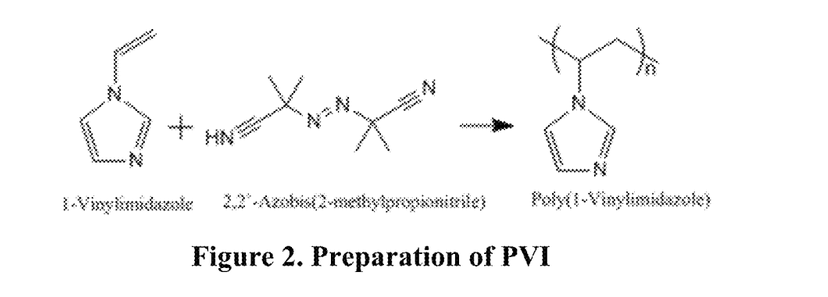
FIG. 2 shows a scheme for the preparation of poly (1-vinyl imidazole) "PVI" according to an embodiment of the invention.

Poly (1-vinyl imidazole) forms a group of hydrogels which have an adequate electron diffusion coefficient. This is used with an enzymatic electrode which can then conduct electrons through the gel's polymer network to the electrodes. In the preparation of PVI, the polymerization of 1-vinyl imidazole involves the bulk thermal polymerization using 2, 2'-azobis-isobutyronitrile (AIBN) as a radical initiator. For this purpose, a mixture containing 3 ml of 1-vinyl imidazole and 0.156 grams of AIBN is heated at 70° C. for one hour under an inert atmosphere of $N_2$. The inert atmosphere may be created by flushing a gentle stream of $N_2$ that displaces the oxygen existing in air. Such inert atmosphere is crucial to remove any traces of oxygen, which would otherwise react with existing radicals, inducing termination of the bulk radical polymerization process. FIG. 2 shows the formation structure of PVI.

After heating is complete, a dark yellow precipitate of PVI is obtained with a yield of about 65.7%.

Purification of PVI

The synthesized polymer, once cooled down to room temperature, is dissolved in methanol and recrystallized by adding the solution dropwise to acetone while stirring vigorously with a magnetic bar. The solution is then filtered using vacuum filtration. The obtained final polymer, of a pale yellowish color, is purified PVI with a yield of about 34.4%.

Preparation of the Osmium Bipyridine Complex

The preparation of the osmium bipyridine complex may be carried out using known methods. The osmium (II) complex with PP (bpy, dmbpy), imidazole and Cl⁻ can act as a much more efficient electron transfer mediators for glucose sensors.

Figure 3:
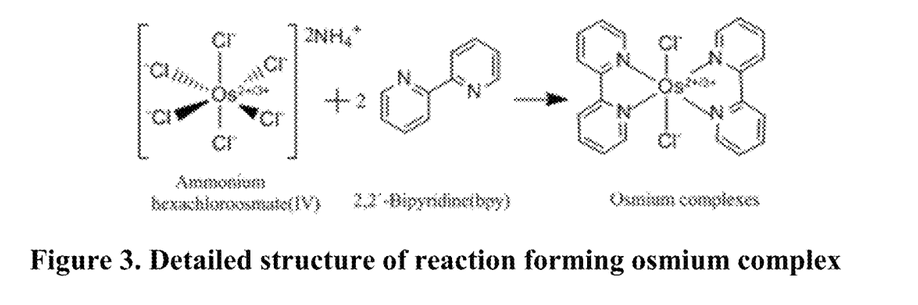
FIG. 3 shows a reaction for forming an osmium complex according to an embodiment of the invention.

Commercial $(NH_4)$ $OsCl_6$ is heated with bipyridine at reflux for 1 hour using 1,2-ethanediol medium under an inert atmosphere and continuous magnetic stirring. 0.5 g of $(NH_4)$ $OsCl_6$ is mixed with 0.356 g of PP (bpy in this case). The heat level is preferably kept at 9. The continuous stir level is preferably kept at 3. The reaction mixture is then allowed to cool down at room temperature. The cooled mixture is then treated with solution of 5.2 g of $Na_2S_2O_4$ and 30 ml of water to reduce any osmium bipyridine ions that may have formed in the reaction mixture. The precipitate of dark violet-black color is collected after cooling for 30 min in ice bath. The associated chemical reaction is shown in FIG. 3.

The osmium bipyridine complex precipitate may be further purified using vacuum filtration. The solid may be washed with water and then diethyl ether.

Alternative Method (Microwave) of Cis-[$OsCl_2(PP)_2$] Synthesis

According to an alternative method, the osmium bipyridine complex may be made according to a microwave method using 0.2 g of $(NH_4)$ $OsCl_6$, 0.1424 g of PP and 4 ml of 1,2-ethanediol in a microwave container. The mixture may be heated using microwave at 200° C. for 20 min. The reaction mixture is allowed to cool down at room temperature afterwards. Then the cooled reaction mixture is treated with a solution of 2.6 g $Na_2S_2O_4$ and 15 ml of water to reduce any osmium bipyridine ions that may have formed in the reaction mixture. The precipitate of dark violet-black color is collected after cooling for 30 min in ice bath. The precipitate may be purified by washing with water and diethyl ether. The cycle voltammetry ΔEp values for Os (II) complex are typically 56-65 mV indicating fast heterogeneous electron transfer potential in the complex. After the PVI and Os complex have been formed, the cross linking of Os-PVI is conducted using chemical derivatization of the redox polymer.

Preparation of the Chemically Derivatized Os-PVI Polymer

Figure 4:
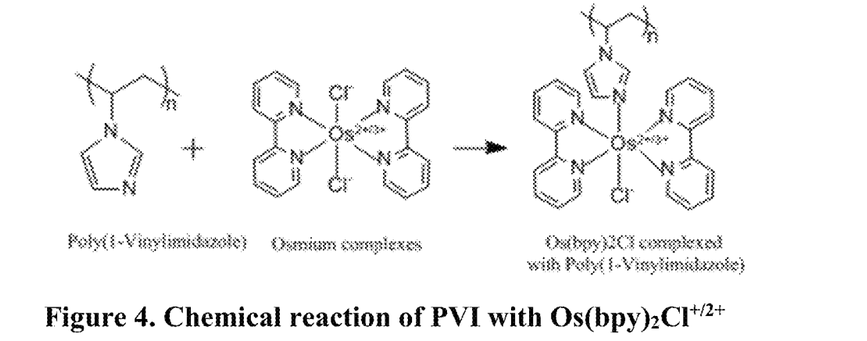
FIG. 4 shows a chemical reaction of PVI with OS(bpy)$_2$Cl$^{+/2+}$ according to an embodiment of the invention.

After filtration, the obtained polymer is subjected to chemical derivatization through the bonding of osmium. The chemical derivatization process involves the reaction of the synthesized polymer with $Os(bpy)_2Cl_2$. Briefly, this method involves the preparation of a mixture of 0.13 g of the vinyl imidazole polymer with a solution of 0.2 g of $Os(bpy)_2Cl_2$ in 10 ml ethanol and heating at reflux conditions for 72 hours. The mass required for PVI is calculated with molar calculations. The osmium bipyridine complex has the chemical formula of $C_{20}H_{16}Cl_2N_4O_5$. The molecular weight is 573.506 g/mol. The number of moles required for 0.2 g of $Os(bpy)_2Cl_2$ to react with the PVI, the number of moles for osmium complex can was obtained as follows:

$$n = \frac{0.2}{573.506} = 0.000343873 \times 4 = 0.0014 \text{ mol},$$

where N=4 (no. of molecules of compound). Therefore, m=n×M=0.0014×94=0.13 g of PVI.

The mixture is heated at 45° C. for three days. The chemical reaction is shown in FIG. 4.

Figure 5:
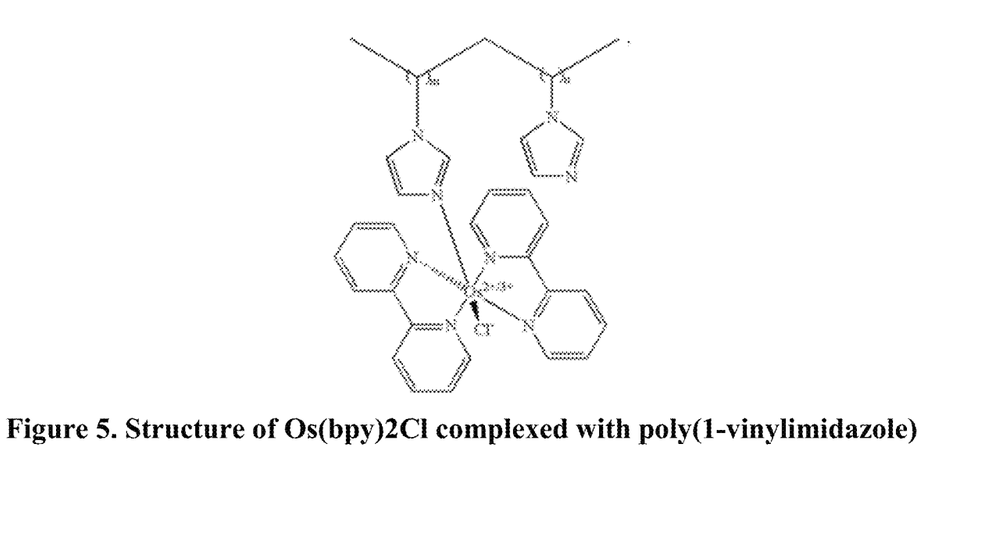
FIG. 5 shows the structure of Os(bpy)$_2$Cl complexed with poly(1-vinylimidazole) according to an embodiment of the invention.

Following the heating, the reflux is complete, and the osmium bipyridine is complexed with the PVI. The final complex is shown in FIG. 5.

The reflux may also be carried out using microwave assisted organic synthesis. In this case the mixture of 0.1 g of $Os(bpy)_2Cl_2$ and 0.065 PVI with 4 ml of ethanol is heated at 120° C. for one hour in the microSYNTH microwave system, significantly shortening the reflux time.

Dialysis of PVI-Os Complex

Figure 6:
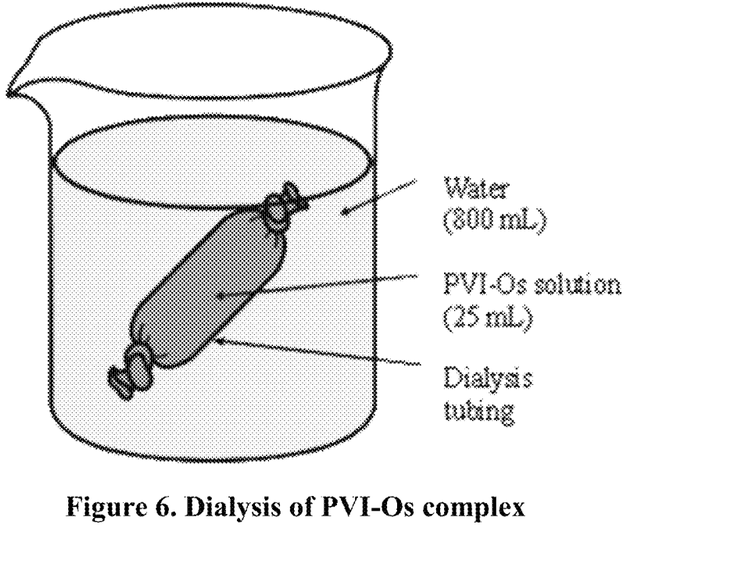
FIG. 6 is a representation of dialysis of PVI-Os complex according to an embodiment of the invention.

Dialysis may be performed for purification purposes to remove unwanted chemicals. This can also be performed to purify the PVI-Os complex. If performed, the following steps may be followed with reference to FIG. 6:

Add 800 ml of water to a 1000 mL beaker.

Place 25 mL of PVI-Os in dialysis tubing and leave in the beaker overnight.

Replace the water and repeat four times, optionally using new/clean beakers.

Polishing Electrode

For the purposes of conducting CV studies, a properly polished electrode is essential. The electron transfer should not be interfered by the contaminants present in the electrode surface. The electrode may be polished according to any known method. Mechanical polishing may be carried out as follows:

Add 0.3 micron of alumina powder ($Al_2O_3$) to glass and then add water.

Polish the electrodes using circular

Rinse off the electrode after polishing it with the alumina solution.

Keep the electrode in a vial that contains water that has been sonicated.

Let the vial (with electrode) sonicate for 2 min in a sonicator.

Take out the electrode and rinse off the electrode

After performing the steps described above, the electrodes can be used in their respective places in the electrochemical cell as working electrode and reference electrode.

Electrodeposition of PVI-Os Complex to the Electrode

The process of electrodeposition on the electrode depends on the scan rate. Higher the current, the higher the scan rate which is shown below.

$$Current \propto Scan\ rate$$

$$Current \propto \sqrt{Scanrate}$$

Figure 7:
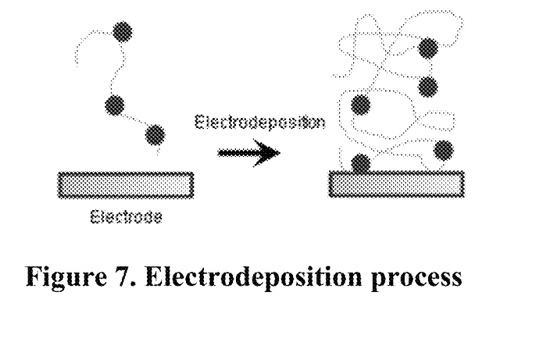
FIG. 7 is a representation of an electrodeposition process according to an embodiment of the invention.
Figure 8:
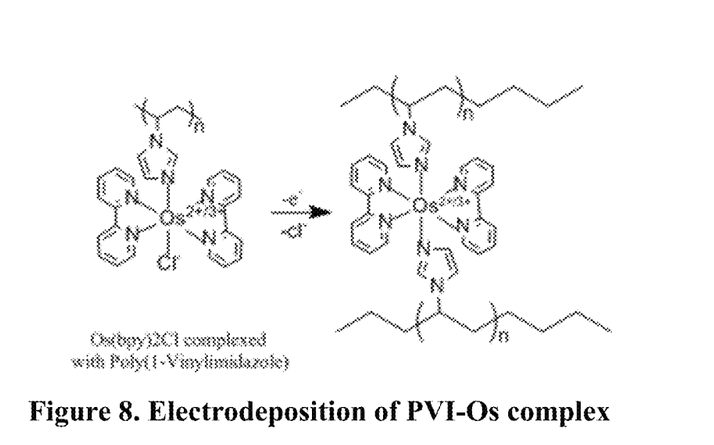
FIG. 8 is a representation of the electrodeposition of a PVI-Os complex according to an embodiment of the invention.

The redox polymer can be electrodeposited using known electrodeposition methods. During electrodeposition, the current arranges random moving PVI-Os molecules on surface bound electrode in the presence of electrons and chloride ions as shown in FIG. 7. The chemical reaction for electro deposition is shown in FIG. 8.

Preparation of the Chemical Sensor Electrode

Figure 9:
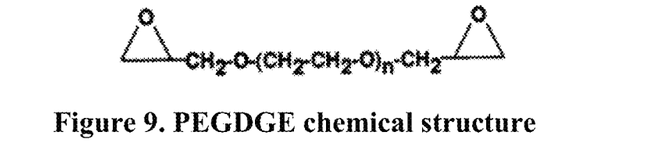
FIG. 9 shows the chemical structure of PEGDGE.

According to an alternative method, the redox polymer can be crosslinked using a PEGDGE crosslinker. The electrode is then modified with the crosslinked polymer which forms a hydrogel in solution. This includes adding the PVI-Os complex to Poly (ethylene glycol) diglycidyl ether, i.e., PEGDGE together in solution. The PEGDGE structure (Peg 400) is shown in FIG. 9.

Figure 10:
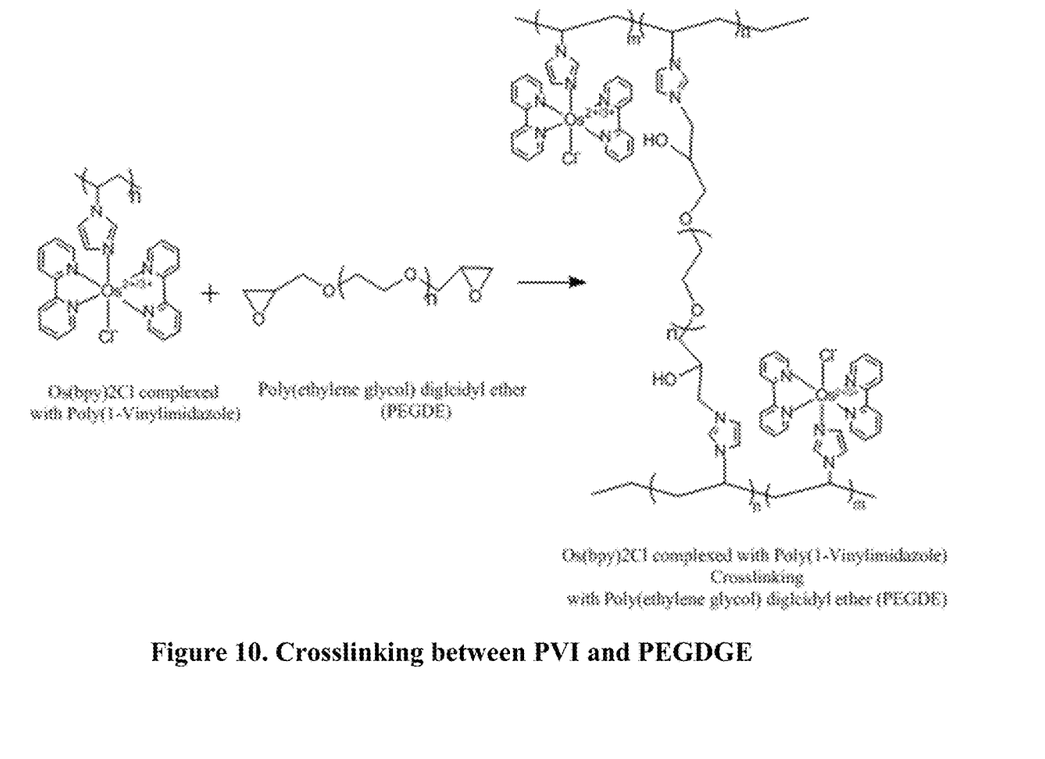
FIG. 10 shows crosslinking between PVI and PEGDGE according to an embodiment of the invention.

The detailed procedures is as follows:
2.5 mL of PEGDGE is added to a vial;
1 mL of deionized (DI) water was added to the above solution;
100 mL from solution above is added to a new vial with 200 mL PVI-Os1 solution (i.e., 5 mL PVI-Os1 and 1 mL buffer of pH 7);
7.5 mL is taken from the second vial and added on the electrode;
The mixture is left to cure overnight to make the first layer of the electrode. To prepare the sensor electrode, first the electrode was modified by crosslinking PVI-Os with PEGDGE, see FIG. 10.

Figure 11:
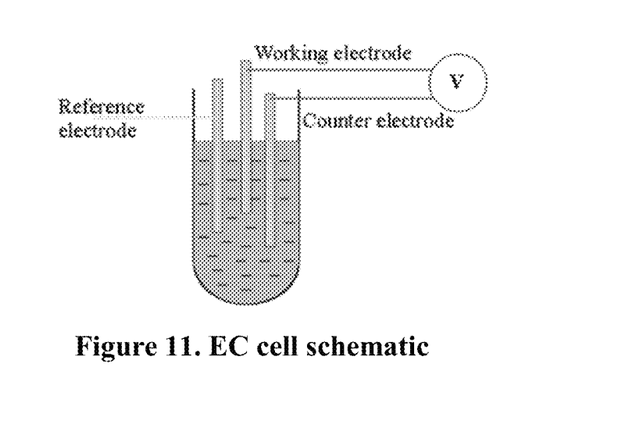
FIG. 11 shows an EC cell schematic according to an embodiment of the invention.

An example of an EC cell is shown in FIG. 11. The PVI-Os modified electrode is immersed in a PBS (pH 7.4) solution containing 10 µM of a selected detection aptamer, and a negative potential of −1.4 V (vs. Ag/AgCl) is applied for 10 min which allows the aptamer to be immobilized in the PVI-Os film. Then the electrode is ready for use in the EC cell as a biosensor using the electrolyte solution and selected analytes as desired. Aptamers are single-stranded oligonucleotides that can strongly and selectively bind to target molecules. The aptamer-based biosensors of the present invention may use uses enzyme-linked aptamer or fully synthesized oligonucleotides, for example, in the case for $AFB_1$ detection.

Testing of Biosensor

The effectiveness of the biosensor of the present invention was demonstrated by detection of aflatoxin $AFB_1$. The aptamer and HRP enzyme oligonucleotide were ordered from Integrated DNA Technologies (Iowa, USA). The sequence of the DNA-HRP that was used was /5HRPMD/AAAAAATGTGGGCCTAGCGA (SEQ.ID.No. 1) in an amount of 250 nmol. DNA-Amino (aptamer) was ordered in 2 batches of 1 µmole and 5 µmole with sequence /5AmMC12/AGTTGGGCACGTGTTGT CTCTCTGTGTCTCGTGCCCTTCGCTAGGCCCAC A (SEQ.ID.No. 2) as ordered. The yield guarantee was different for these two batches with the first being 44 nmol and later being 219.8 nmol. The biosensor conditions were varied with different electrodes. The temperature was kept constant at 37° C. In the procedures for testing AF with the biosensor, only the amounts of AF were changed whereas the aptamer and DNA-HRP was kept constant. The following were the general procedures that were followed during testing of AF:

The respective electrode was crosslinked using PVI-Os and PEGDGE as described above. The crosslinked electrode was also tested using PBS using CV.

The aptamer that was obtained from external source was electrodeposited onto the electrode. This was also tested with CV and I-t studies. The voltage was kept at −1.4 V- and two-time conditions were applied: 5 min and 10 min. Later, the electrode was rinsed with water and tested with buffer two times using CV as well.

Incubation of HRP, $AFB_1$ and PBS was done so that reaction could take place in solution. The electrode was kept inside the incubated solution for 20 min at 37° C. and tested again. Only the amounts of $AFB_1$ were changed for the several test runs. The electrode was tested for CV at 0.6-0.2 V range. The amount of $AFB_1$ that was used during the experiments ranged from 0.1 ng/mL to 100 ng/mL.

The electrode from the above step was put into $H_2O_2$ solution to measure the AF level. Also, CV test and I-t test were conducted. The reason for using $H_2O_2$ solution is that it leads to the highest reduction of current making the detection of AF faster.

Experiments utilizing four different electrodes (labeled) and $AFB_1$ quantities are shown in table below:

TABLE 1

| Selected experimental runs | | |
|---|---|---|
| Electrode | HRP-DNA (µM) | $AFB_1$ (ng/mL) |
| C1 | 1 µM | None |
| C2 | None | None |
| C3 | 1 µM | 0.1 ng/ml |
| C4 | 1 µM | 0.01 ng/ml |

During the testing, the aptamer quantity was kept constant at 10 µM and $H_2O_2$ was kept at 1 mM.

Results and Discussion

All electrochemical studies were performed using a CH Instrument Electrochemical analyzer in a single compartmental cell with a three-electrode configuration comprising a Pt wire as the auxiliary electrode, a glassy carbon electrode as the working electrode, and Ag/AgCl as the reference electrode. The CV profiles were obtained for the electrodeposition process, cross-linking and rhenium compounds interaction with DNA.

Data from Electrodeposition

Figure 12:
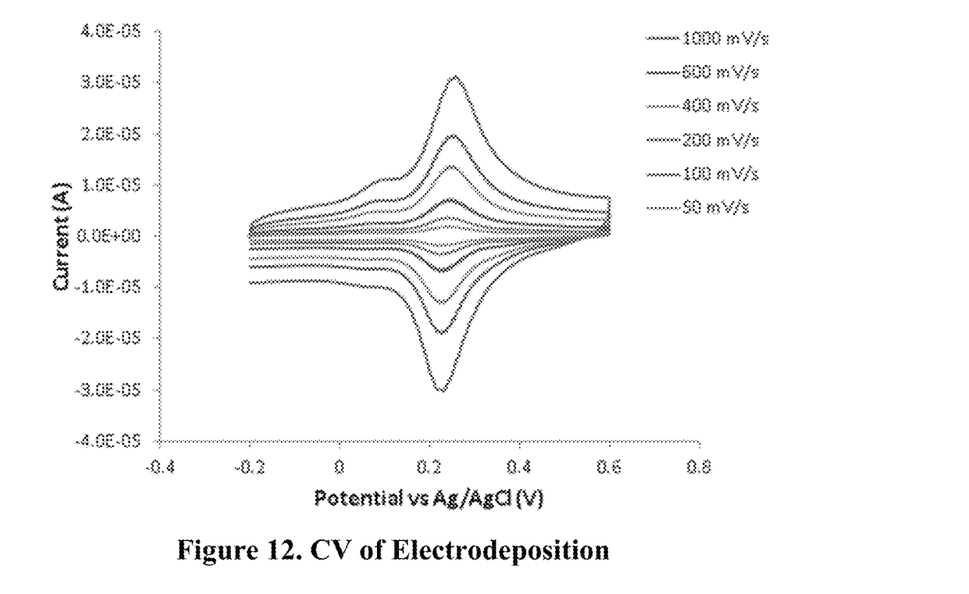
FIG. 12 is a chart showing current versus voltage for electrodeposition according to an embodiment of the invention.

During the electrodeposition of the redox polymer, several scan rates were utilized to obtain the voltammograms. There is dependence of the scan rate of the cyclic voltammograms with that of the completed electrodeposited polymer as scan rates were varied from 50 mV/s to 1000 mV/s. Results are shown in FIG. 12.

It can be seen that as the scan rate increases so does the peak current; however, the peak separation remains almost constant, indicating a reversible process.

Figure 13:
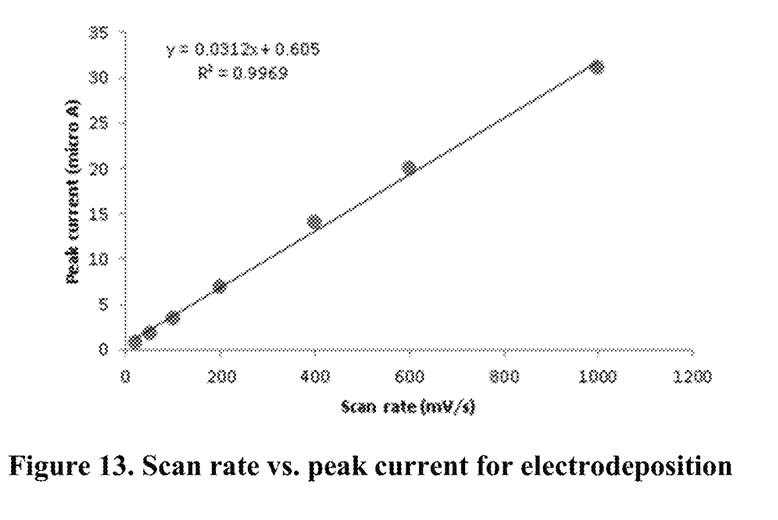
FIG. 13 is a chart showing scan rate vs. peak current for electrodeposition according to an embodiment of the invention.

As shown in FIG. 13, peak current is directly proportional to the scan rate, suggesting that the redox species is surface-bound and that the redox process is diffusion-independent.

Data from Cross Linking

The cross linking of the redox polymer via PEGDGE forms the electrical wire with which the electrons can be transferred from the target molecule with help of the solvent in the EC cell. This way there is higher sensitivity and freedom for the electrons to move. The CV graph at FIG. 14 shows asymmetrical voltammograms, but the peaks of separation have higher values compared to the electrodeposition results.

Figure 14:
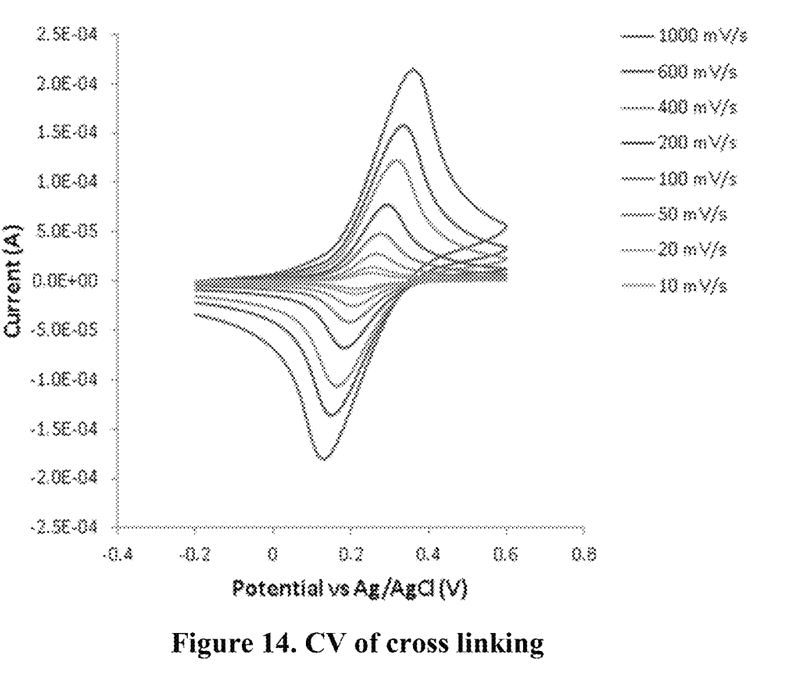
FIG. 14 is a chart showing current versus voltage for crosslinking according to an embodiment of the invention.
Figure 15:
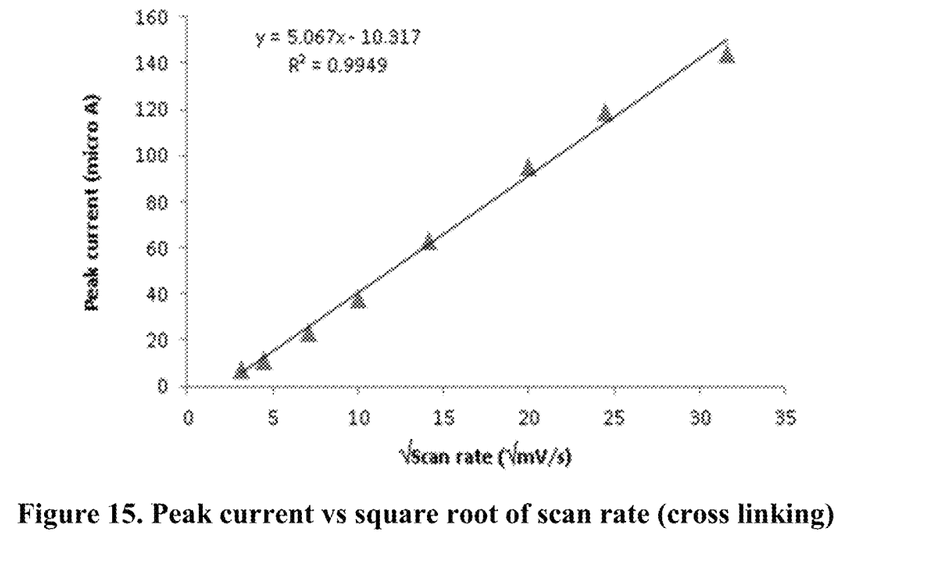
FIG. 15 is a chart showing peak current versus the square root of scan rate during crosslinking according to an embodiment of the invention.

As can be seen in FIG. 14, with PEGDGE crosslinking, the peak current increases drastically with increasing scan rate; furthermore, the peak current is proportional to the square root of the scan rate (FIG. 15), suggesting this is diffusion controlled, according to the Randles-Sevcik equation:

$$i_p = 0.4463 \; nFAC\left(\frac{nFvD}{RT}\right)^{1/2}$$

where,
$i_p$=current maximum in amps
n=number of electrons transferred in the redox event (usually 1)
A=electrode area in $cm^2$
F=Faraday Constant in C $mol^{-1}$
D=diffusion coefficient in $cm^2/s$
C=concentration in $mol/cm^3$
v=scan rate in V/s
R=Gas constant in J $K^{-1}$ $mol^{-1}$
T=temperature in K
or, $$i_p=(268,600)n^{3/2}AD^{1/2}Cv^{1/2}$$

at 25° C. Although PVI-Os is crosslinked and deposited on the electrode surface, the redox species, the Os complex, still behaves like diffused species in a solution, unlike the case of electrodeposition where the Os complex behaves as surface-confined species. The reason for this is that with PEGDGE crosslinking PVI-Os forms a flexible and gigantic matrix, and upon hydration forms a micro-environment that is very similar to the bulk solution; Os complex inside the matrix therefore behave as diffusional species and follows the Randles-Sevcik equation. This also explains the excellent electron-conducting property of the PEGDGE-crosslinked PVI-Os polymer.

Data from $AFB_1$ Tests

Figure 16:
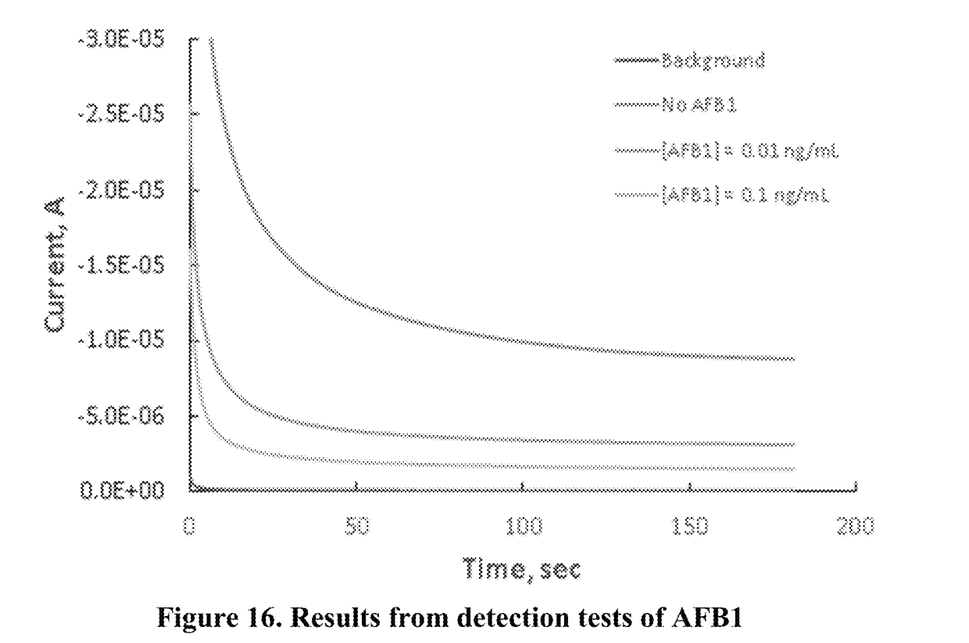
FIG. 16 shows the results from detection of aflatoxin AFB$_1$ using a biosensor according to an embodiment of the invention.

The last phase of testing consisted of testing aflatoxin $AFB_1$ in the presence of aptamer and redox enzyme (HRP), the results of which are shown in FIG. 16. There were varying conditions used in which the concentration of the aflatoxins was changed to create some optimal conditions for binding the target molecules. The CV and I-t tests conducted for these varying conditions. These conditions are the presence (in different quantities of $AFB_1$) and absence of it from the solution. The sensor electrode (PVI-Os/aptamer-modified electrode) was incubated in 300-4, PBS (pH 7.4) solution containing 1 μM HRP-oligo and varied amounts of $AFB_1$ at 37° C. for 20 min.

The electrode was then rinsed with PBS and immersed in PBS containing 1 mM $H_2O_2$, and while a potential of 0.1 V was applied the reduction current was recorded as shown in the above figure. The stabilized current (which should be obtained in about 3 min) was then used as a measure of the concentration of $AFB_1$ in the sample. The background current was obtained using the sensor electrode (PVI-Os/aptamer-modified electrode) without the incubation step. Since no HRP-DNA was present to be captured by the aptamer, $H_2O_2$ would not be reduced at the electrode hence the detected current was extremely low, $\sim 5.5\times10^{-8}$ A. The detection was based on a competitive model in which the immobilized aptamer could bind to both the HRP-oligo and $AFB_1$. However, the binding between the aptamer and $AFB_1$ is stronger than that between the aptamer and the HRP-oligo. When there was no $AFB_1$ in the sample the amount of aptamer-bound HRP-oligo was the most, resulting in the highest reduction current of $H_2O_2$ ($\sim 8.8\times10^{-6}$ A). As the concentration of $AFB_1$ increased in the sample, less HRP-oligo would be captured by the aptamer, leading to decreased reduction current. It can be clearly seen from the figure that higher amounts of $AFB_1$ reduces the current generated from the analyte solution.

Comparing the working range of the tests conducted we can see from the data that anywhere from 0.01 ng/mL to 0.1 ng/mL of sensitivity of $AFB_1$ samples can be detected using this novel method. In literature, working sensitivity level as low as 0.05 ng/mL has been reported for $AFB_1$ on corn and paprika using extraction methods based in methanol-PBS and methanol-water, respectively. Therefore, the novel electrochemical immunosensor for $AFB_1$ that is described here has higher sensitivity levels than previous biosensors. The novel method takes advantage of the aptamer-PBS solution to keep the detection of $AFB_1$ to low levels as 0.01 ng/mL.

Biosensors were constructed using both electrodeposition and PEGDGE crosslinking. PEGDGE crosslinking resulted in sensors with larger reduction current and higher sensitivity.

As shown in FIG. 16, when the $AFB_1$ concentration decreases in the sample, the reduction current of $H_2O_2$ increases as more HRP-labeled DNA get captured by the aptamer. The highest reduction current is, of course, $8.8\times10^{-6}$ A when there is no $AFB_1$ in the sample. A 0.01 ng/mL concentration of $AFB_1$ is readily detected, which is comparable or better than most current detection methods. Furthermore, at 0.01 ng/mL the reduction current is only $\sim 3\times10^{-6}$ A, leaving a very broad range from $8.8\times10^{-6}$ A (maximum current). We expect the detection limit to be significantly lower than 0.01 ng/mL.

The invention claimed is:

1. A method for the detection of biological targets, comprising providing a biosensor comprising an electrochemical cell comprising a reference electrode, a working electrode, and a counter electrode in a shared volume, the working electrode having fixed to its surface a redox polymer,
immobilizing a target-specific capture aptamer on the working electrode;
adding an electrolyte solution into the shared volume;
applying a voltage across the working electrode and the counter electrode;
adding to the electrolyte solution in the shared volume a sample solution suspected of containing the biological target and a solution containing an horseradish peroxidase ("HRP")-labeled oligonucleotide having a nucleotide sequence that is complimentary to a sequence of the capture aptamer;
measuring a reduction current in the electrochemical cell;
wherein the HRP-labeled oligonucleotide comprises a nucleotide sequence of SEQ.ID.No. 1.

2. The method of claim 1, wherein the redox polymer is Osmium derivitized poly(1-vinylimidazole).

3. The method of claim 1, wherein the redox polymer is electrodeposited on the working electrode.

4. The method of claim 1, wherein the redox polymer is crosslinked to the working electrode with poly(ethylene glycol) diglycidyl ether ("PEGDGE").

5. The method of claim 1, wherein the working electrode is a carbon-based electrode, the counter electrode is a platinum wire, and the reference electrode is Ag/AgCl electrode.

6. The method of claim 1, wherein the electrolyte is $H_2O_2$.

7. The method of claim 6, wherein the HRP catalyzes the electroreduction of the $H_2O_2$ to water.

8. The method of claim 1, wherein the biological target is aflatoxin $B_1$ ("$AFB_1$").

9. The method of claim 1, wherein the target-specific capture aptamer comprises a nucleotide sequence of SEQ.ID.No.2.

10. A biosensor comprising:
a reference electrode, a working electrode, and a counter electrode in a shared volume, the working electrode having fixed to its surface a redox polymer,
a target-specific capture aptamer immobilized on the working electrode;
an electrolyte solution in the shared volume and in communication with the reference electrode, the working electrode and the counter electrode;
a voltage source for applying a voltage across the working electrode and the counter electrode;
a solution containing an HRP-labeled oligonucleotide having a nucleotide sequence that is complimentary to a sequence of the capture aptamer;
wherein the HRP-labeled oligonucleotide comprises a nucleotide sequence of SEQ.ID.No. 1.

11. The biosensor of claim 10, wherein the redox polymer is Osmium derivitized poly(1-vinylimidazole).

12. The biosensor of claim 10, wherein the redox polymer is electrodeposited on the working electrode.

13. The biosensor of claim 10, wherein the redox polymer is crosslinked to the working electrode with PEGDGE.

14. The biosensor of claim 10, wherein the working electrode is a carbon-based electrode, the counter electrode is a platinum wire, and the reference electrode is Ag/AgCl electrode.

15. The biosensor of claim 10, wherein the electrolyte is $H_2O_2$.

16. The biosensor of claim 10, wherein the HRP catalyzes the electroreduction of the $H_2O_2$ to water.

17. The biosensor of claim 10, wherein the biological target is AFB 1.

18. The biosensor of claim 10, wherein the target-specific capture aptamer comprises a nucleotide sequence of SEQ.ID.No. 2.

* * * * *